Dec. 12, 1933.  J. P. MAXFIELD  1,939,074
SOUND PICTURE RECORDING SYSTEM
Filed Feb. 27, 1931  7 Sheets-Sheet 1

INVENTOR
*J. P. MAXFIELD*
BY
*G. H. Heydt*
ATTORNEY

Dec. 12, 1933.  J. P. MAXFIELD  1,939,074
SOUND PICTURE RECORDING SYSTEM
Filed Feb. 27, 1931  7 Sheets-Sheet 3

INVENTOR
J. P. MAXFIELD
BY
G. H. Heydt.
ATTORNEY

Dec. 12, 1933.  J. P. MAXFIELD  1,939,074
SOUND PICTURE RECORDING SYSTEM
Filed Feb. 27, 1931   7 Sheets-Sheet 6

FIG. 10.

INVENTOR
J. P. MAXFIELD
BY  G. H. Heydt
ATTORNEY

Patented Dec. 12, 1933

1,939,074

UNITED STATES PATENT OFFICE 1,939,074

SOUND PICTURE RECORDING SYSTEM

Joseph P. Maxfield, Maplewood, N. J., assignor to Electrical Research Products Inc., New York, N. Y., a corporation of Delaware Application February 27, 1931. Serial No. 518,659

8 Claims. (Cl. 88—16.2)

This invention relates to methods and means for recording sounds in synchronism with motion pictures and more particularly to methods and means for obtaining a sound record in a recording studio which is so related to an accompanying picture that when reproduced, the sound, either vocal or from a musical instrument carried by a person, appears to follow the person as he moves about in the scene, producing for an audience an illusion of being spectators of an actual scene.

When a person is viewing a scene in real life, the scene may be said to be viewed with two lenses which are the eyes and to be heard with two "microphones" which are the ears. Two eyes enable him to appreciate distance or depth in scene with much greater facility than is possible with a single eye. Two ears enable him to appreciate direction and perhaps to some extent, depth in sound. A point of importance, however, is that the eyes and ears maintain a fixed relationship to one another. A consideration of this fact, in particular, has brought about this invention for making more realistic the sound record and accompanying picture.

The problem of obtaining natural results in studio recording of motion pictures with sound, divides itself into three parts; first, a determination of what factors are of importance to an actual observer in the appreciation of depth of sound and direction of sight, second, a determination of which of these factors are usable under the conditions of photography and acoustic pick-up for talking pictures and third, the control of acoustics in the set and the position of the microphone or pick-up device in order to make use of the available factors.

The term microphone is well understood and will be used hereinafter as a term which implies the use of any type of acoustic pick-up device or transmitter for use in connection with sound recording devices.

The factors which enter into the appreciation of depth or perspective in sound are the ones of particular interest. The most important factor, particularly where monaural hearing, i. e., hearing with one ear, or recording over a single channel, is concerned, is that which deals with the relative change in loudness of the direct and reflected sounds. The intensity of the average reflected sound varies relatively little from place to place in a room, while the intensity of the direct sound from the source to the microphone varies quite rapidly with the distance of the source from the ear or microphone. Therefore, the ratio of intensity of the direct to the reflected sound varies considerably. Hence, as a source of sound, such as a person speaking, recedes from the ear or microphone, the decrease in the loudness of the direct sounds reaching the receiving instrument causes the reflected sounds reaching this position to be relatively more pronounced. These changes in the ratio of direct sound to reflected sound are unconsciously interpreted as distance when heard directly or when properly recorded and reproduced.

In the case of a talking motion picture, the camera has only one lens or "eye" and the sound recording system only one "ear" or in other words one channel to a single sound recording device, so that effects which are brought about naturally by binocular seeing and binaural hearing can not be made use of. Long experience with photography has enabled the camera-man to create a part of the depth illusion by the proper choice of focal length of the lenses used, and by the proper type of lighting. However, in acoustics the control of the impression of depth depends upon factors, the control of which has only recently been discovered. This control makes effective the impression of depth with monaural listening such as in a sound recording system and is accomplished by controlling the ratio of intensity of direct sound to intensity of reverberent, i. e., reflected, sound present.

Again referring to actual scenes in the studio production, the loss of direction brought about by the use of one ear only causes some rather unexpected results. When both ears are used, a person has the ability to consciously pay attention to sounds coming from a given direction to the partial exclusion of sounds coming from other directions. With the loss of the sense of direction which accompanies the use of monaural hearing or recording, this conscious discrimination becomes impossible. Thus the incidental noises occurring in a scene, such a foot-falls, the rustling of paper, etc., as well as any reflected sounds which may be present, unduly intrude themselves upon the hearer's notice when reproduced unless acoustically modulated by the arrangement of the recording set to produce less reflection of sound than would be normal for binaural hearing. These facts must be taken into consideration in recording sound for a film, particularly in a scene which is artificially represented in a set, in order that the noises and multiply reflected sounds be made to create the illusion of reality when reproduced for an audience. The effect of the increase in incidental noises and reverberations may be easily detected in a room by completely stopping up one ear and listening with the other only, particularly where such incidental noises are fairly loud and where the amount of damping is less than in the normal living room, such as in an office.

In the control of acoustics in a studio set one of the most important requirements for obtaining the illusion of reality is that the sound shall appear to come from and follow the movements of the visible source on the screen. In order to create this illusion, in both the visual and audible parts of the talking pictures, it is necessary that the amount by which the sound source appears to move toward or away from the observer in the studio set should correspond with the amount of movement of the image or scene from which the sound emanates. This amount by which the sound source appears to move depends upon the amount of reverberation or multiply reflected sound present and upon the distance of the microphone from the sound source. In general, the more reverberation present or the further the microphone from the sound source, the greater is the apparent distance of the sound from the near foreground.

The object of this invention is, therefore, to provide methods and means adaptable to sound motion picture sets or scenes either depicting indoor or outdoor scenes consisting in placing the microphone in a relation to the sound source which bears a definite relation to the camera placement with respect to the scene or subject. The distance at which the microphone is placed from the source from which the sound emanates is also related to the focal length of the camera lens. The coefficient of absorption of the materials which determine the reflection of sound reaching the microphone position must also be considered, together with the placement of such materials, so that the sound as finally recorded is truly correlated with the image recorded by the camera and when reproduced, the sound changes in character in a natural and anticipated manner in view of the action of the visible image on the screen.

When the acoustics have been controlled according to the prescribed method herein set forth, the illusion of depth is properly created. When this depth illusion has been obtained it is impossible for a listener to locate accurately the direction of the source of sound during reproduction. The reverberations recorded react in much the same manner upon the listener as though the reverberations of the recording room occurred directly behind the screen during reproduction. Let it be assumed, by way of example, that the stage of a theater is the studio set or room in which sound and scene have been recorded. Since it is impossible to locate accurately the direction of the source of the sound when the acoustic conditions have been properly controlled, the listener in the theater obtains the illusion of the sound coming from somewhere in front of the theater, namely, from the studio scene or stage. If, simultaneously the studio scene or picture of the source of sound is thrown on the screen at the center or one side of the stage, the sound appears to come from the visible source. This effect is so pronounced that if the image from which the sound emanates moves sideways across the screen the sound appears to follow. This appearance of the sound following its apparent source sideways is, however, purely psychological and exists only so long as audible methods do not permit us to locate the sound. This condition is met by the method herein described. However, the effect of the sound following the image from front to back is not psychological but is physically controlled by the methods disclosed herein.

When there is not sufficient sound reflection or reverberation in the recording, the source of sound can be audibly located as coming from a particular loud speaker during the reproduction. When the reverberation is too great, the sound appears to come through an open window from an empty room behind the screen on the stage. Either condition may entirely destroy the effect of the sound originating at its apparent source.

The design of acoustics of the set itself must be considered according to the scene to be depicted. Where sets either depicting indoor or outdoor scenes are built in the open outdoors, the natural conditions for recording can be made ideal since sounds leaving the set do not return to interfere. This enables acoustic conditions to be completely controlled by the correct design of the set. If the set is built inside of a larger sound stage it is essential that this stage shall be as sound absorbing as possible in order to duplicate as nearly as possible these ideal conditions.

Most scenes depicting out-of-door events are not free from reflection as the majority of them contain buildings or other acoustically hard objects. If, therefore, an outdoor scene is being imitated in an indoor studio, this fact must be taken into account. For this reason, when an outdoor scene is taken in an indoor set, it is important that the walls of the set be natural acoustically but that the walls of the surrounding stage be sound absorptive so that they imitate open air conditions. The acoustics of a set for depicting an indoor scene must be natural for the scene to be depicted.

The four factors on the stage which most influence intelligibility and naturalness are loudness, frequency characteristics, reverberation and noise. The control of reverberation and resonant effects is particularly important in the creation of natural reproduction. Satisfactory results for the ideal studio set can be obtained with three walls made of materials which acoustically imitate those represented in the scene produced. The absence of the ceiling and one end wall, both of which open outdoors or into a dead sound stage contribute the necessary extra damping required for monaural listening or recording. Lighting fixtures and other objects which cover part of the ceiling area or objects covering part of the open end are other considerations which regulate the construction of the set.

It is therefore seen that this method of acoustic pick-up requires to some extent the building of a set having proper acoustic conditions outdoors or inside of a room, or stage which is so sound absorbent that it does not appreciably contribute to the acoustic properties of the set under the conditions of practical use. Under this condition, it is possible to obtain desired acoustic properties without continually changing the nature of the surfaces in the larger sound stage itself. It is obvious that from a practical standpoint this is very desirable.

Having obtained a set whose acoustic properties are within recognized limits, the next phase of the problem is the relation of the microphone position to the camera position and the relation of both to the sound source and scene or subject. A relation exists between the focal length of lens in the camera and the position of the microphone with relation to the sound source. While the eyes of a real observer have only one focal length, it is well known that the camera-man has lenses of various focal lengths for use in photographing scenes at various distances from the camera and of various sizes for any given distance. These lenses of various focal lengths can be used in photographing pictures without deviating from the principles herein set forth since allowance is made for focal length. The relation between the sound source, microphone and camera is quite different for lenses of different focal length. This relation, however, may be expressed as a percentage of camera distance for each lens of a particular focal length in a set of constant acoustics.

It may be said that the microphone is given a sound distance which depends on the size of image of a scene or subject recorded by the camera. This sound distance varies in different type sets, which variation depends upon the sound reflecting properties of the set. As a basis for calculations, let it be assumed that for a set of average sound reflecting properties, the position for a camera using a 35 millimeter lens is the same as the position for a microphone if the sound source is in the same position as the subject to be photographed. Thus, the microphone distance has a unity ratio to camera distance, i. e., is one hundred percent of camera distance, although the measurement of these distances would change together if the subject and sound source moved toward or away from the camera and microphone. Using the same 35 millimeter basis as unity for calculations, the distance from a camera equipped with a 100 millimeter lens to the subject, and the distance from the associated microphone to a sound source positioned with the subject, are quite different. Let it be assumed, by way of example, that a camera equipped with a 100 millimeter lens is placed at the proper distance to record an image of the subject the same size as would be recorded by the 35 millimeter camera. Under this condition, the microphone would be placed in the position it would have been in if the 35 millimeter camera were used and the camera equipped with the 100 millimeter lens is positioned approximately three times the distance from the subject and sound source. The distance or sound distance from the microphone to the sound source is thus approximately one-third (accurately 35%) of the distance from the camera equipped with the 100 millimeter lens to the subject which is in the same position as the sound source. The position of a camera using a 35 millimeter lens as a basis for calculations is not a requirement, since other positions may be used as unity for such calculations. The foregoing is, however, an example of the method prescribed for obtaining the desired relation between pictures and accompanying sounds.

The use of more than one microphone position at one time tends to destroy the proper depth illusion and as a result, the sounds very frequently fail to follow the sound source about the set. The use of only one microphone position at a time for each camera is, therefore, very important for obtaining the illusion required. Under some conditions this effect may be obtained by fading from one microphone to another where it is impracticable to move the microphone as sometimes required under certain conditions of recording.

Inasmuch as it is desirable to recognize the difference between a sound in the foreground and a sound in the background, it becomes necessary that the microphone be placed in the same general direction from the scene as is the camera so that when an actor recedes from or approaches the camera, he also recedes from or approaches the microphone. Under these conditions it is possible to take a dialogue with the actors facing directly at right angles to, or even directly away from, the microphone since the change in quality which accompanies the changes in direction is only that which would be expected as a person turns in the picture. As the actor moves forward or backward, excepting in general action photography in which the shorter focal length lenses are used, the microphone position is ordinarily changed to maintain the proper percentage ratio between the microphone distance from the sound source and camera distance from the scene or subject.

With a set having the necessary amount of sound reflection or reverberation the high frequencies which fail to reach the microphone directly from the source will reach it after reflection from the walls and, therefore, leave the intelligibility relatively unimpaired. This failure to get the higher frequencies of speech directly but only by reflection from a speaker facing away from the microphone is one of the factors which brings about the desired change in quality in a voice when a person turns away and talks with his back toward the microphone and camera. When reproduced, the sound will be that to be expected from a person appearing in the picture with his back turned toward the audience.

By the use of one microphone and the use of walls for the set giving the proper reverberation, freedom of action is permitted to the actors since it is not necessary for the people speaking to know where the microphone is placed and they are therefore able to carry on their acting in a natural manner. The position of the microphone is changed according to the position of the actor or sound source, if necessary. The changes in microphone position may be prearranged since the movements of an actor or other sound sources are determined on rehearsal for photographic reasons and therefore the microphone positions may be calculated according to the positions to be taken by the actor or sound source. With such an arrangement a much wider range of loudness can be recorded without loss and with this arrangement it is ordinarily unnecessary to operate a volume control during the recording of the sound picture scene. This freedom from operation of the volume control cannot be too strongly emphasized, as such operation during the recording may completely change the emotional effect and materially reduce the desired illusion of naturalness. However, in some special instances it may be necessary to control the volume, particularly where it is the desire to match the volume of a weak voice with a strong voice occurring in the same scene or where the range of loudness exceeds that which can be successfully recorded. For this purpose, volume control apparatus is supplied.

The invention will be better understood from the following detailed description and associated illustrative embodiment.

Figs. 9—A, 9—B, 9—C and 9—D represent films recorded in the sets, Figs. 7 and 8.

Figure 1:
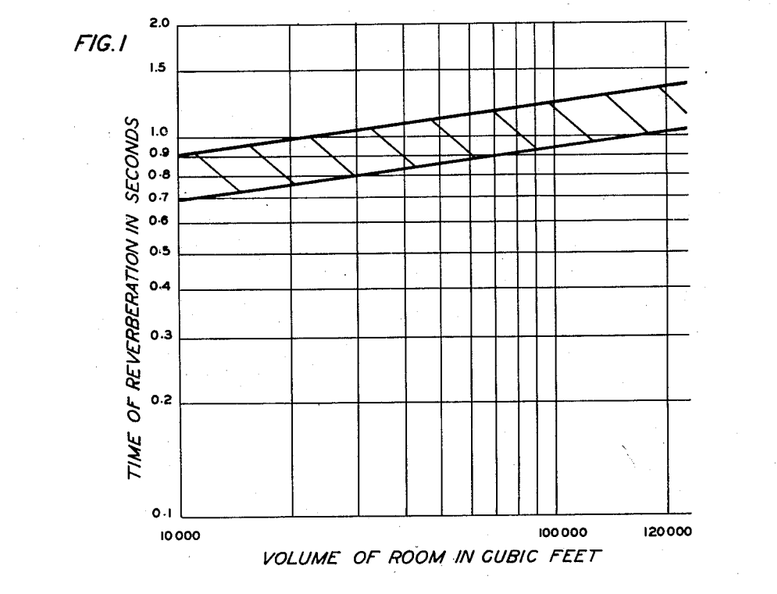
Fig. 1 is a curve showing time of reverberation for recording of music.

A curve is shown in Fig. 1 which represents the region in which optimum reverberation time should fall for single-channel recording of music for scoring and general purposes. The vertical ordinates represent the time of reverberation in seconds and the horizontal ordinates represent the volume of various sizes of rooms in cubic feet. The method of obtaining any given time of reverberation within a room is completely described in Watson's "Acoustics of Buildings". It should be noted that in this figure there are two lines plotted. The upper of these represents the maximum acceptable time, whereas the lower line represents a minimum time. Any value lying between these two lines is pleasing and leaves some leeway of choice to the director as to just what he thinks will produce the most pleasing sound effects.

Figure 2:
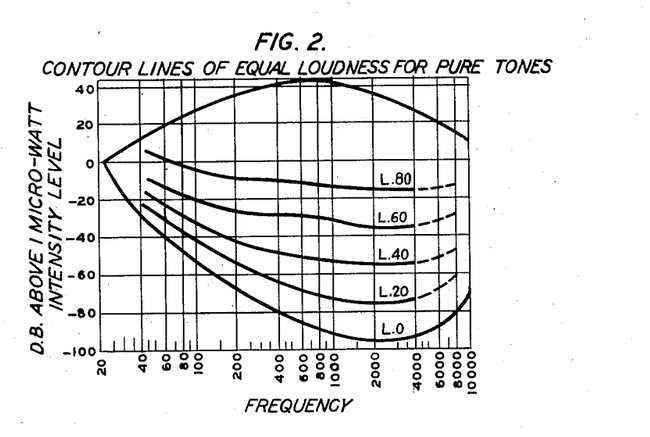
Fig. 2 shows a speech frequency curve.

It will be understood that recording according to the present method will be at volumes or in volume ranges as determined by study of the well understood curves of Fig. 2 which show the limit of audibility and the limit of feeling for the various frequencies. The benefits obtained from the use of such curves may be applied to any form of recording and do not specifically form part of the results sought by this invention.

There is one important difference between the mechanism of a human observer of a scene being depicted in a studio set and the mechanism of a recording machine for recording a sound picture. The observer maintains his pick-up devices or ears at the same distance from the scene as his lenses or eyes. This is not necessarily the case with the talking picture recording mechanism. The camera must be positioned outside of the scene and action. The camera-man thus finds it convenient and necessary to use lenses of different focal lengths whereas the observer cannot change the focal length of his eye, beyond that amount required to accommodate focus. The use of long focus lenses by the camera-man is equivalent to a means of bringing distant action into the near foreground. When such action is brought into the near foreground by the use of the close-up or long focus lenses, it is also necessary to position the microphone so that the sound appears to be coming from a similar distance, that is, from an image of the size recorded by the camera. To explain this more clearly an example may be given of two cameras which are arranged to record images of the same size, one camera being twice as far from the subject as the other camera. The lens in one camera would, for this result, be twice the focal length of the lens in the second camera. Since the image recorded by both cameras is the same size, it would not be a true reproduction of natural seeing and hearing if the sound recorded were different for one of these pictures than for the other. Thus in both cases the microphone placement should have the same relation to the sound source, assuming that the sound either emanates or is depicted as emanating from the position of the subject. In all cases of this character the size of image recorded by a camera should have a distinct bearing upon the relation of the microphone to the sound source.

There is one other point to be kept in mind regarding the analogy between the observer and the sound picture recording equipment. If a speaker in the scene walks away from the observer he increases the distance from both the eyes and ears of the observer. It is, therefore, necessary to place the microphone in the same approximate direction from the action as the camera in order that the speaker shall approach the microphone when approaching the camera and vice versa.

In this character of recording, the image of the subject recorded by the camera may change in size as it moves toward or away from the camera or as the camera moves toward or away from the subject. If the sound is coming from the same position as the position of the subject, the position of the microphone should be changed, depending upon the focal length of lens in the camera, to correlate the sound recorded with the size of image recorded. Any change in the distance from the sound source to the microphone is proportional to the change in distance from the subject to the camera but this change in microphone distance is varied according to the focal length of the lens in the camera.

It is an aid in the proper use of this technique of producing the illusion of reality to know the coefficient of absorption of the materials used for a studio set at various sound frequencies. This is taken into consideration in addition to the focal length of the lens in calculating the microphone placement with relation to the sound source.

To properly reproduce sounds a certain degree of reverberation must be included. This must, however, not be confused with the persistence of sound caused by resonating walls or partitions since these effects are harmful and can by proper construction of the set be eliminated. Consideration in constructing a set must also be given to the facts herein brought out regarding the difference between the effect of reverberation on one and two ears. In recording over a single channel from one or more microphones, less reverberation must be present than is natural in the ordinary room in which people listen to sounds with two ears. It has been discovered that by a particular arrangement and construction of the recording studio set and by the correlation of the sound recording instrument with the size of image the natural rhythmic beauty of the complete range of sounds herein set forth and the natural coordination of sounds with the image depicted can be maintained.

Figure 3:
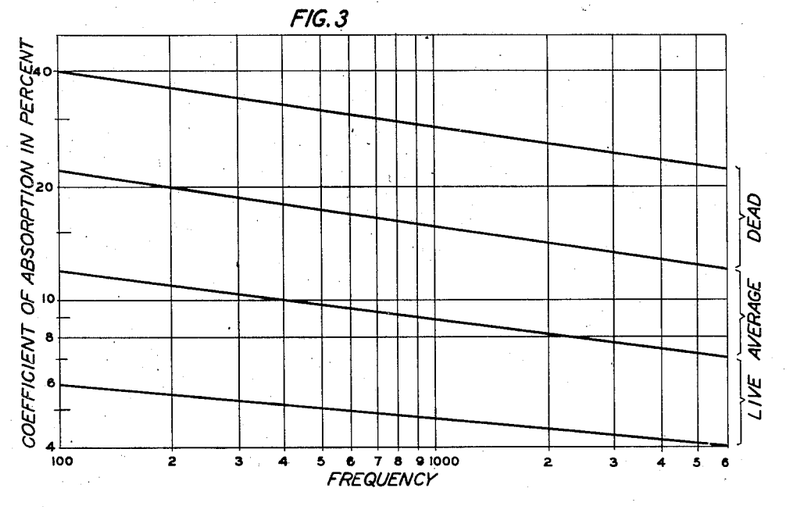
Figs. 3 and 5 show sound absorption curves.

It is desirable to use materials of average absorption for recording studio sets. However, the material which may be selected for a recording set is not always the most desirable from a recording viewpoint since artistic and other requirements are to be considered. Wherever possible, materials of average absorption are chosen and by artifices made to appear the same as that which they represent. When, however, a lesser or greater absorption factor is present in the materials from which a recording set is constructed the character of the set (that is, whether live, average, or dead) may be determined from the curves of Fig. 3. These curves were developed by measurement of various set materials. The distance of the microphone from the sound source is then figured according to the curves shown in Fig. 4.

Figure 5:
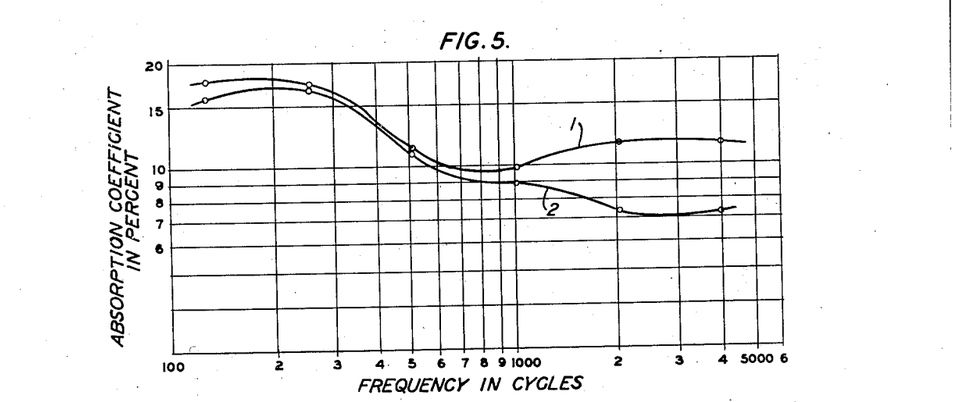

In order to include the fundamentals for the method of recording pictures and accompanying sound described herein, Fig. 5 has been included to illustrate the frequency absorption characteristic of a material used for studio sets treated in two different manners. Curve No. 1 of Fig. 5 illustrates the frequency absorption characteristic of masonite covered with crepe paper. Curve No. 2 illustrates the frequency absorption characteristic of masonite covered with crepe paper and then painted with one coat of oil paint.

The frequency absorption characteristics for the studio set materials is determined by means of reverberation measurements, as described in articles by Wallace Sabine, Watson and others.

Figure 4:
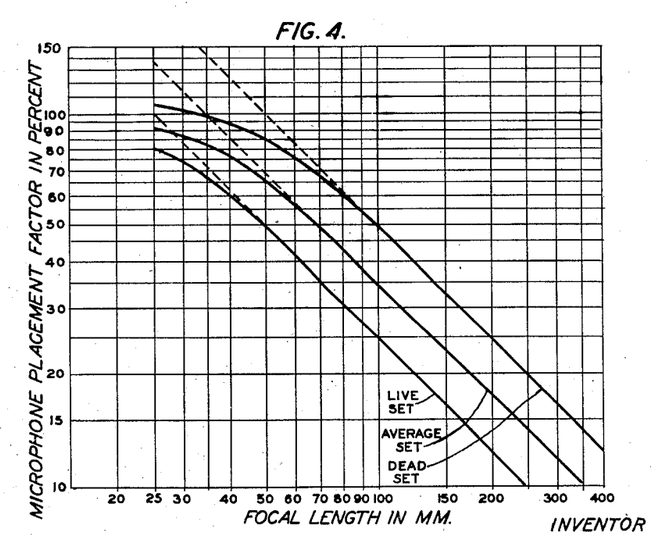
Fig. 4 shows a microphone placement chart or curve.
Figure 8:
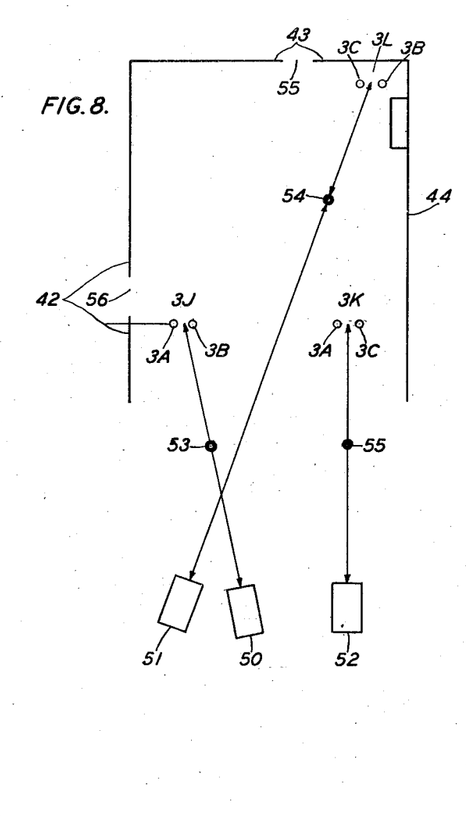
Figure 9A:
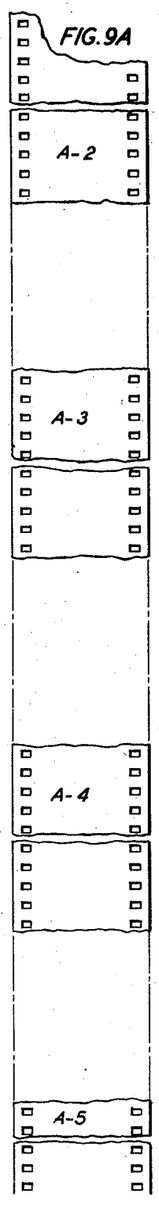
Figure 9B:
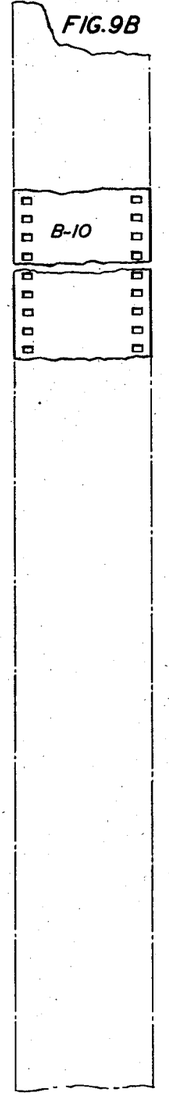
Figure 9C:
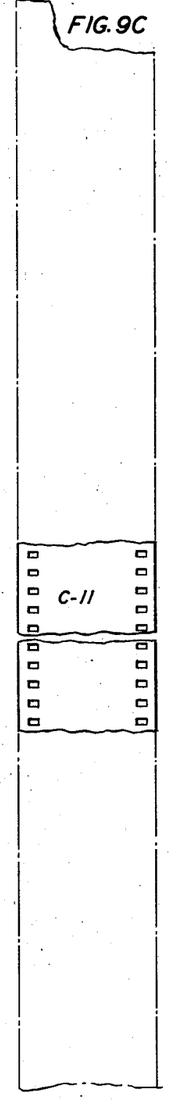
Figure 9D:
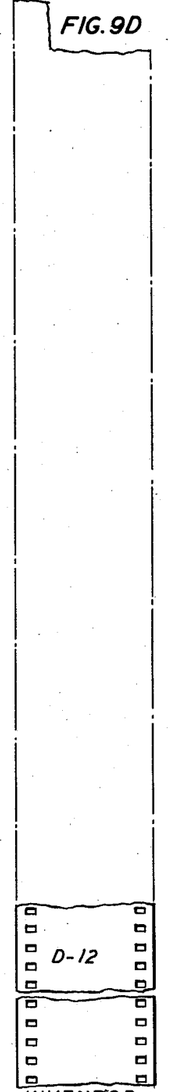

By referring to Figs. 4 and 8, an example of the means for producing results giving the illusion of reality with sets composed of different materials may be observed. Let it be assumed that camera 50 of Fig. 8 is equipped with a 75 millimeter lens and that the camera is fourteen feet from the sound source. If the walls of the set are made of materials of average absorption the distance of microphone 53 from the sound source at position 3J will be figured according to the curve or chart shown on Fig. 4 for average sets. As shown on the chart, Fig. 4 for an average set and a 75 millimeter lens, the microphone distance is approximately forty-seven per cent of the distance from the camera to the scene which includes the sound source. For this type of set, the distance of the microphone 53 from the sound source position 3J is, therefore, approximately six and one-half feet. By the same method, when materials are used which have a coefficient of absorption bringing them within the live set curve, a different percentage of the camera distance must be used. Assuming the same distance between a camera equipped with a 75 millimeter lens and scene, the microphone distance from the sound source in a live set would be taken as thirty-four per cent of the distance between the camera and the scene including said sound source. This would equal approximately four and three-quarter feet. For the dead set the dimension between the microphone and the sound source would be approximately nine feet.

Figure 6:
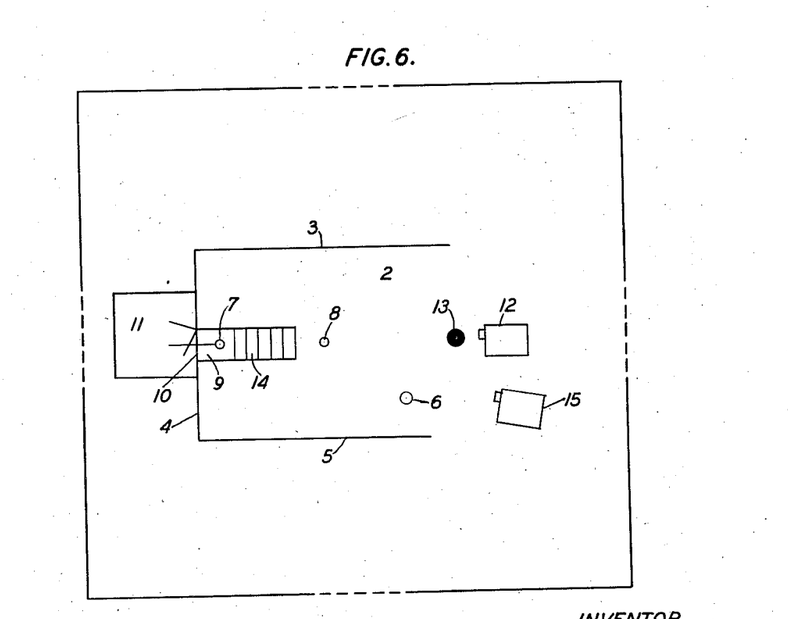
Figs. 6, 7 and 8 represent typical sound recording sets.

As herein set forth the coefficient of absorption or sound reflecting properties of materials is obtained by methods well known in the art. Where this and the focal length of the camera lens are known, the curves of chart, Fig. 4, may be used for the placement of the recording microphone in a studio set constructed according to the recording method and instructions set forth herein. If for any given focal length of lens the microphone is positioned a percentage of the distance from the camera to the subject and sound source according to this chart, a natural and uniform relation will exist between the sound and the image of the size recorded. The correct distance from the microphone to the sound source is obtained by taking a percentage of the distance from the sound source to the camera. The curves indicate the percentages to be used for sets of differing absorption qualities, as shown by this curve. The lines of this chart are theoretically straight lines as indicated by the dotted lines. Experience has indicated, however, that because of extraneous noises of various origin, it is preferable when using lenses of short focal length to work closer to the scene than corresponds with theory. Until such a time as ideal conditions can be obtained the curve for practical purposes should be as indicated by the full lines. The deviation of the full lines from the theoretical is not great enough to appreciably impair the desired illusion. Theoretical values may be used at present for lenses having a focal length greater than 60 millimeters. When ideal conditions are practical the theoretical values shown by the dotted lines may be used. The sound reflecting properties of the materials used in a three or four walled set or room govern the selection of the curve to be used for microphone placement. In producing pictures with sound, it has been the practice in recording some scenes to economize by recording a single sound track for both close-up and long-shot pictures. It is apparent that such a combination would not produce pleasing results since the sounds would not be in proportion with the size of images in at least one set of the pictures. That is, they would be out of proportion with either the long-shot or close-up pictures and possibly both, depending upon the manner of recording the sounds. Experiments were made in the set shown in Fig. 6 both with the economical method of recording and the method prescribed herein. The set represented a large hall with an entrance through a stairway from a second story room 11 at the back of the set. A dialogue was started between a man in position 6 and a lady in room 11. Both moved to the foot of the stairway at 8 during an ensuing dialogue. Close-up or large image pictures were made with camera 15 and long-shot or small image pictures of the general action were made with camera 12. A complete sound track was made with the microphone properly placed for the small image pictures which when reproduced with the large image pictures was very disconcerting, since the sound did not appear to come from the speaker. A separate sound track was then made to accompany the large image pictures with the microphone properly placed which when reproduced correlated the sound and image.

Figure 7:
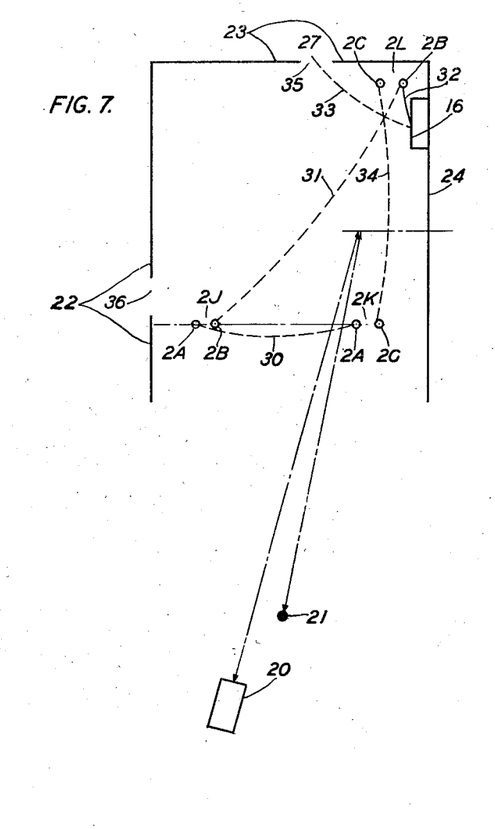

Since the interpretation of distance by the microphone depends upon the acoustic properties of the set there is only one microphone position in which the proper sound distance or depth will be obtained. Hence, when a change is made from small general action images to larger close-up images, it is necessary to move the microphone nearer the sound source. Figs. 7 and 8 show two views of the same set and the same action. Fig. 7 indicates the camera and microphone position for a long-shot covering the general action in the scene. Fig. 8 indicates the camera and microphone positions for close-ups of each of the three dialogues, namely, those at positions 3J, 3K and 3L.

It may be assumed that the scenes recorded in the studio sets of Figs. 7 and 8 depict the warden of a prison in his living quarters. This particular scene takes place in the warden's dining room. The general action of the scene starts in position 2J where a convict, acting the part of the warden's valet, hands the warden his hat and cane. At this time the warden's wife stands at 2C in position 2L. During this period the convict stands at 2A and the warden at 2B. The convict then walks from position 2J to position 2K and the warden walks from position 2J to position 2L, as shown by the dotted lines. Dialogues take place at 2J and during the period of transition. A dialogue then takes place at 2L between the warden and his wife. After this dialogue the warden steps to the mirror 16, puts on his hat and passes out of the door 35 continuing the dialogue with his wife until he is outside of the door. The wife then walks forward from position 2L to position 2K and in this position a dialogue takes place between the convict standing at 2A and the warden's wife standing at 2C.

The camera 20 is used for the general action occurring in the set. The views of the participants in the scene are smaller than the close-up views of the same participants taken with the cameras 50, 51 and 52 since the views are of broader scope and include in each picture a majority of the scene and the participants therein. Let it be assumed that for this general action a 35 millimeter lens is used in camera 20 and that the camera is located approximately twenty-five feet from the central position of the studio action. In order to correlate the sound effects with the picture effects, the microphone 21 is placed eighty-two percent of the camera distance from the assumed central position of action. Under ideal recording conditions one-hundred per cent may be used. In the case of general action with small image pictures of the participants, a general central location for the microphone is desirable. These figures are assumed for a set of average absorption and are figured according to the curve, Fig. 4. In this case, therefore, the microphone is placed approximately twenty-one feet from the position of the general action for recording sound effects during the transition period between position 2J, 2K and 2L and as previously described between position 2L, the mirror at 16 and the door 35. The pictures on the film taken with this camera include all of the action of the scene, and the sound track is made accordingly. The pictures and sound tracks for the close-ups taken with cameras 50, 51 and 52 are later substituted for the same action in the general action film.

In Fig. 8 the image for the screen is made the same size with all three cameras 50, 51 and 52. These views are all what are known as close-ups. In order to accomplish this a 75 millimeter lens is used in cameras 50 and 52 which are both approximately fourteen feet from the position of the scene and sound source, at 3A and 3K. A 150 millimeter lens is used in camera 51 which is approximately twenty-eight feet from the scene and sound source position 3L. Each camera will, therefore, produce an image of the same size and for this reason the sound recorded should be effectively the same. The positioning of the microphone for the 75 millimeter lens camera has been covered. Referring again to the curve, Fig. 4, it will be found that the distance from the sound source at position 3L to the microphone 54 is the same as the distance from the microphone 53 to the sound source position 3J. Considering a set made of materials of average absorption this dimension is approximately six and one-half feet for each of the microphones 53, 54 and 55. With this arrangement the sound both direct and reverberative is the same for the three close-up views shown for Fig. 8.

Consideration will now be given to the composite films made from the records of cameras 20, 50, 51 and 52, and microphones 21, 53, 54 and 55. Fig. 9—A illustrates the film depicting the general action taken with camera 20 with sections omitted for insertion of the close-up views. Fig. 9—B illustrates the first close-up taken at position 3J with camera 50. The only portion of this film used is as shown at B—10. The film B—10 is patched between the portions of film A—2 and A—3. In Fig. 9—C portion of film C—11 is the close-up taken with camera 51. This is patched into the general action film 9—A between portions of film A—3 and A—4. In Fig. 9—D the section of film D—12 is taken with camera 52 and is patched into the general action film between A—4 and A—5. Four films are similarly used for recording the sounds accompanying this set of pictures. In some recording systems the pictures and accompanying sound records are placed on the same film. Ordinarily the sound effects are recorded on separate films which in this case would constitute a film such as 9—A for the general action sound effects recorded through the agency of microphone 21 and films such as 9—B, 9—C and 9—D for recording the close-up sound effects through the agency of microphones 53, 54 and 55 respectively.

Figure 10:
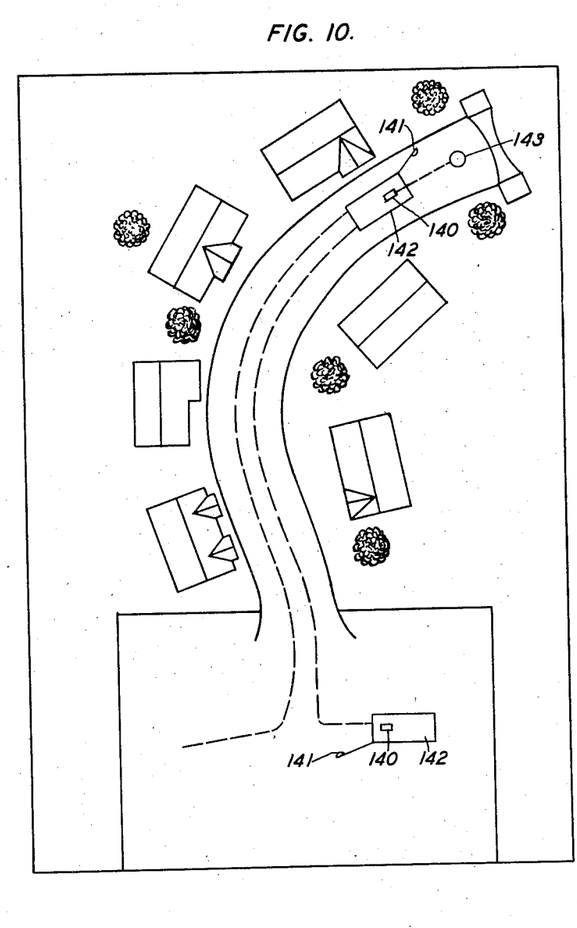
Figs. 10 and 11 illustrate other studio sets arranged for a portable or movable microphone.
Figure 11:
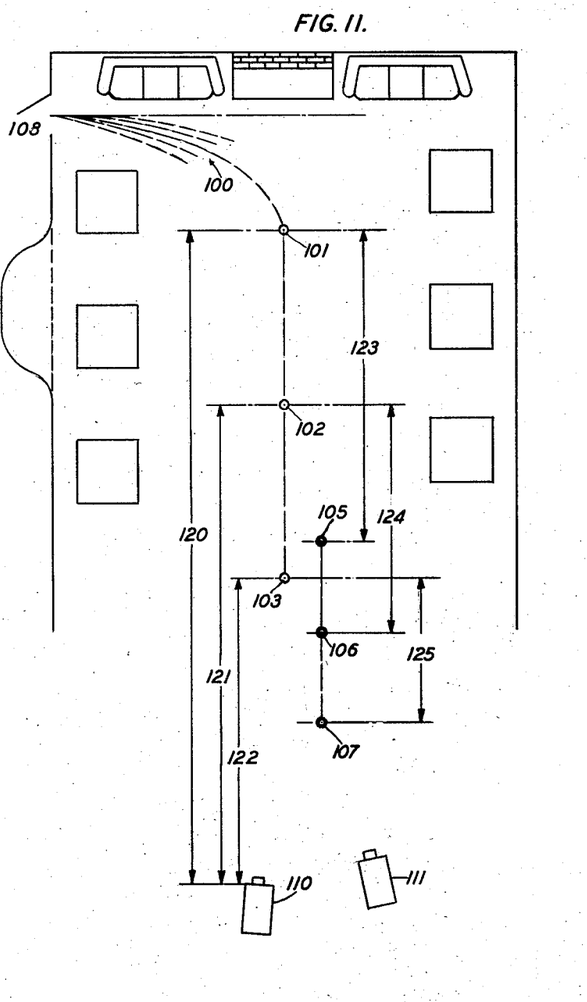

To illustrate the conditions of different sets in which the correlation of the camera and microphone with the scene including the sound source, Figs. 10 and 11 are included. Fig. 10 shows a camera 140 mounted on a movable truck 142 with a microphone 141 also mounted on the truck, arranged to record pictures and the accompanying sound of a subject and sound source at 143. This figure illustrates a street down which the hero or subject proceeds. The truck with the camera and microphone moves down the street as shown by dotted lines, a particular distance ahead of the subject to be recorded. Performances are enacted during this march. A stop is made to take close-up pictures and accompanying sound records with separate cameras and associated microphones which are not shown. The general action was taken with the truck camera which was equipped with a 35 millimeter lens. The microphone was placed on a boom a distance from the sound source according to the chart shown in Fig. 4.

The studio set in Fig. 11 represents a cafe scene in a European university town. The scene is entitled "The Accordion Dance" and is opened by eight girls dancing into the set through the door 108. The eight girls form two lines, one on either side of the open space at 100 and continue to play their accordions. The leading lady of the picture dances forward down the center to the spot 101. The foregoing action was taken with camera 111 equipped with a 35 millimeter lens. The microphone for the accompanying sound track was located according to the chart Fig. 4 for this action. In position 101 the leading lady who is singing and playing an accordion is recorded by camera 110 and the microphone at 105. Camera 110 is equipped with a 75 millimeter lens for close-up views of the leading lady. The distance 120 from camera 110 to position 101 is approximately thirty-four feet. The microphone for the accompanying sound record is, therefore, positioned at 105, approximately sixteen feet from the sound source at 101 which is the dimension at 123. During this cafe scene the leading lady advances toward the camera 110. As an example, two positions of advancement are shown at 102 and 103. During this gradual approach toward the camera, the position of the microphone must be changed to obtain the proper acoustical effects and the proper correlation of the sound and image recorded. The microphone is, therefore, arranged on a movable boom and means provided for gradually changing the position of the microphone from position 105 through position 106 to position 107 as the leading lady advances toward the camera in such manner that its distance from the singer is always approximately forty-seven per cent of her distance from the camera. When the leading lady advances to position 102, the distance 121 from the camera to position 102 is approximately twenty-five feet. The distance from the microphone at 106 to position 102 is, therefore, less than it was when the leading lady was at position 101 and the microphone at position 105. The dimension 124 at this time is thus only twelve and one-half feet. When the leading lady arrives at position 103, the dimension between the sound source and the microphone is further diminished. The distance 125 between the sound source at 103 and the microphone at 107 is at this time seven and one-half feet. Thus, as the distance is diminished between the camera and the scene the distance from the sound source to the microphone is gradually changed on a percentage basis according to the chart shown on Fig. 4.

In the chart or curve, Fig. 4, only three lines have been shown for typical sets. It should be understood, however, that this chart is intended to cover the microphone placement for sets below, above and between the lines shown.

While only one microphone or sound pick-up device is desirable, it should not be considered beyond the scope of this invention to use a plurality of pick-up devices in the positions given for microphone placement.

What is claimed is:

1. A method of recording pictures and accompanying sound consisting in fixing a distance from a sound pick up device to a scene including a sound source as a percentage of the distance from the camera to the scene and in setting said percentage according to the focal length of lens in the camera graded from a minimum percentage of said distance for a lens of maximum focal length to a maximum percentage of said distance for a lens of minimum focal length.

2. A method of recording pictures and accompanying sound consisting in positioning a sound translating device a distance from a scene including a sound source which distance is a percentage of the distance from the picture recording camera to the scene, in fixing said percentage according to the focal length of lens in the camera and sound reflecting property of materials affecting reverberation of sound reaching the sound translating device and in basing said percentage on a downward gradation for increased focal length of lens and a downward gradation for increased sound reflection of materials affecting reverberation.

3. A method of recording pictures and accompanying sound consisting in a calculated correlation of the microphone and associated camera with the scene including the sound source comprising the arrangement of the camera position and lens for recording on a film a particular size of image of said scene, in positioning the microphone a percentage of the distance from the camera to the scene and in usuing as a primary basis for said percentage of distance, the focal length of lens in the camera according to a gradation from maximum percentage for minimum focal length to minimum percentage for maximum focal length and as a secondary basis, a gradation from maximum percentage for minimum sound reflecting properties of materials affecting reverberation of sound reaching said microphone position to minimum percentage for maximum sound reflecting properties of said materials.

4. A method of recording pictures and accompanying sound consisting in microphone placement with relation to a sound source at a distance representing a given percentage of the camera distance from the scene which includes the sound source, in calculating the percentage ratio of distances according to the focal length of lens in the camera and the sound reflecting properties of materials affecting reverberation of sound reaching said microphone and in grading said ratio from the smallest difference in said distances for recording with minimum focal length lens and materials of minimum reflecting properties to the greatest difference in said distance for recording with maximum focal length lens and materials of maximum reflecting properties.

5. A method of recording pictures and accompanying sound consisting in enacting a scene with sound in recording sets of known acoustic properties constructed in the form of a room with one wall and the ceiling omitted to reproduce normal acoustical effects for monaural recording of sound, in a particular calculated correlation of the distance from the microphone to the sound source and the distance from the camera to the scene including the sound source, said correlation consisting in establishing a percentage ratio of said distances according to the focal length of lens in the camera and the acoustic properties of the set and in grading said ratio from the smallest difference in said distances for recording with minimum focal length lens in a set made of materials of minimum sound reflecting properties to the greatest difference in said distances for recording with maximum focal length of lens in a set made of materials of maximum sound reflecting properties.

6. A method of recording pictures and accompanying sound consisting in enacting a scene with sound in which the distance from the subject and associated sound source to the picture recording mechanism varies, resulting in a change in the size of the recorded image of the subject and consisting in varying the distance between the sound source and sound pick up mechanism in proportion with the variation in the size of image recorded according to a set percentage ratio, the distance between the sound source and pick up mechanism thus being varied proportionately less than the distance between the camera and scene.

7. A method of recording pictures and accompanying sound consisting in enacting a scene with sound in which the distance from the subject and associated sound source to the picture recording mechanism varies, resulting in a change in the size of the recorded image of the subject, in varying the distance between the sound source and the sound pick up mechanism a set percentage of the distance between the subject and the picture recording mechanism constituting changing the distance between the sound source and sound pick up mechanism a proportionately lesser amount than the distance between the subject and picture recording mechanism and in fixing said percentage for the focal length of lens in said picture recording mechanism based on a downward gradation for increased focal length of lens and based on a downward gradation for increased sound reflection of materials affecting reverberation of sound reaching the sound pick up mechanism.

8. A method of recording pictures and accompanying sound consisting in enacting a scene with sound in a recording studio set of known acoustic properties in which the distance from the subject and associated sound source to the picture recording mechanism varies, resulting in a change in the size of the recorded image of the subject, in varying the distance between the sound source and sound pick up mechanism a set percentage of the distance between the subject and the picture recording mechanism, constituting changing the distance between the sound source and sound pick up mechanism a proportionately lesser amount than the distance between the subject and picture recording mechanism and thus varying the distance between the sound source and sound pick up mechanism substantially in proportion to the variation in the size of image recorded, and in fixing said percentage according to the focal length of lens in the picture recording mechanism graded from a minimum percentage of said distance for a lens of maximum focal length to a maximum percentage of said distance for a lens of minimum focal length and according to the sound reflecting properties of materials affecting reverberation of sound reaching said pick up mechanism graded from a minimum percentage of said distance for materials of maximum sound reflecting properties to a maximum percentage of said distance for materials of minimum reflecting properties.

JOSEPH P. MAXFIELD.